March 29, 1960

P. V. TERRY
RESETTABLE TIME SWITCH

2,930,860

Filed June 9, 1958

3 Sheets-Sheet 1

INVENTOR.
Paul V. Terry
BY Robert F. Peek
His Attorney

March 29, 1960  P. V. TERRY  2,930,860
RESETTABLE TIME SWITCH

Filed June 9, 1958  3 Sheets-Sheet 3

INVENTOR.
Paul V. Terry
BY *Robert L. Leek*
His Attorney

United States Patent Office 2,930,860
Patented Mar. 29, 1960

2,930,860
RESETTABLE TIME SWITCH

Paul V. Terry, Portland, Oreg., assignor to General Electric Company, a corporation of New York Application June 9, 1958, Serial No. 740,961

7 Claims. (Cl. 200—38)

This invention relates generally to improvements in resettable time switches and more particularly to improvements in such a time switch that forms a part of a demand meter.

Demand meters are extensively used to record the kilowatt demand on a power system by large users of electrical power and in their various forms they all usually measure the demand over a twenty-four hour period during successive intervals of either 15, 30, or 60 minutes. At the end of the measuring interval, and in the case of a recording demand meter, the total demand during the interval is recorded on a suitable record, and the demand meter must be reset to zero to ready itself for the next demand interval.

Various forms of both internal and external timing mechanisms have heretofore been used to measure the demand intervals and in combination with switches or other devices have been used to initiate resetting of the demand meters at the end of each interval. In the case of an internal time switch, i.e., one that forms a part of a demand meter, the switch associated with the timing mechanism must be able to reset itself as well as the indicating and recording components of the associated demand meter, and those heretofore used have generally been complex and costly, often difficult to adapt for a variety of demand intervals, and sometimes not suitable for use in demand meters capable of reliably handling as many as 999 demand impulses in any given demand interval.

It is an object of this invention to provide a new and improved resettable time switch intended for use as a part of a demand meter wherein there is attained a high degree of simplicity, economy, reliability, adaptability, and versatility.

Figures 1, 3:
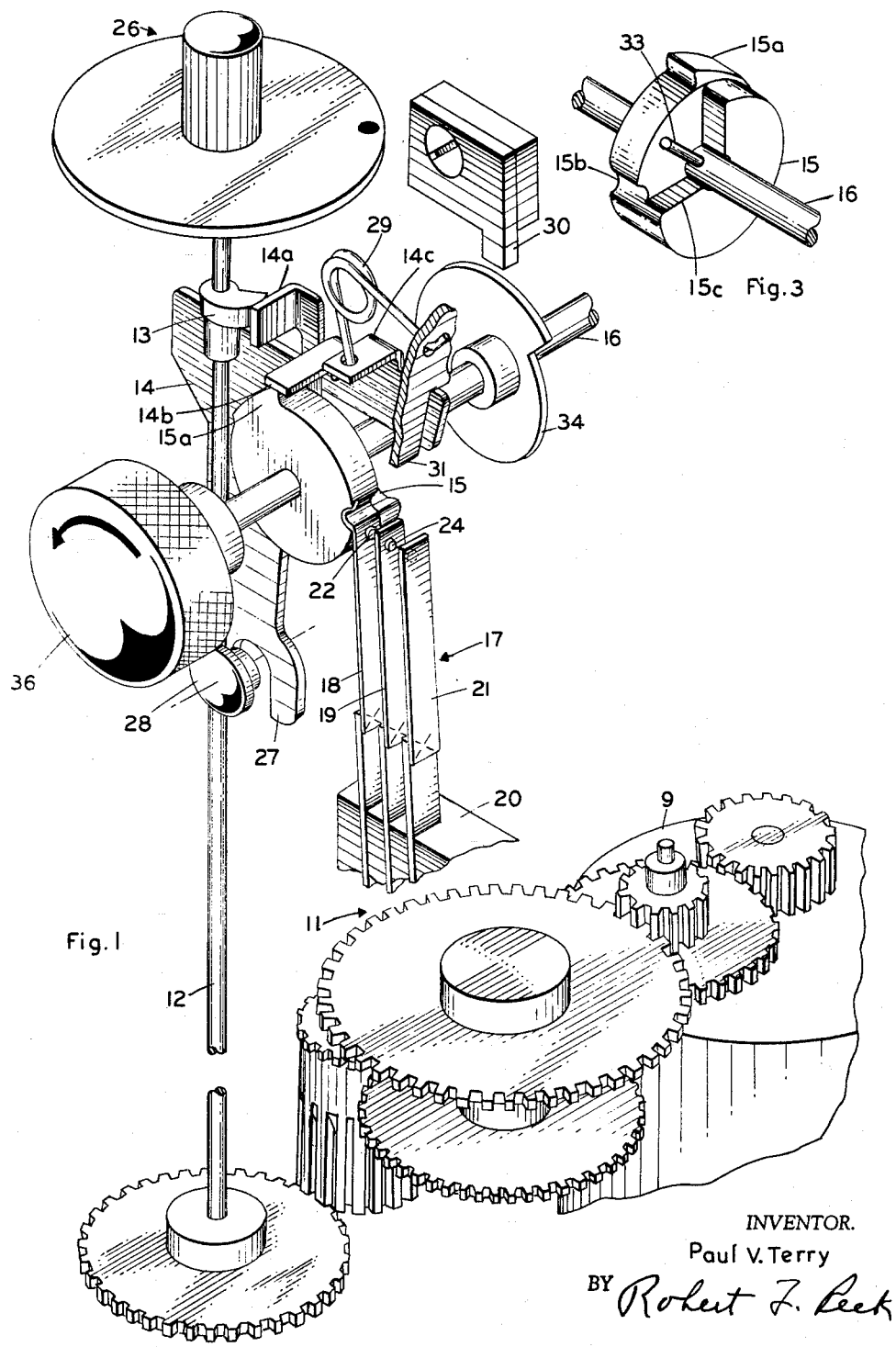
Figure 2:
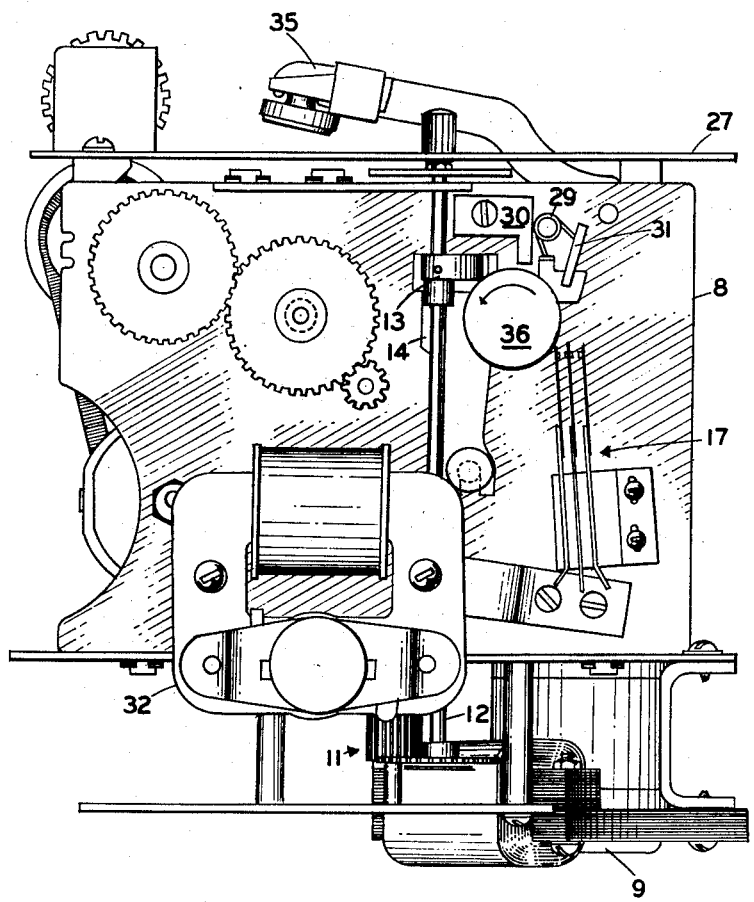
Figure 4:
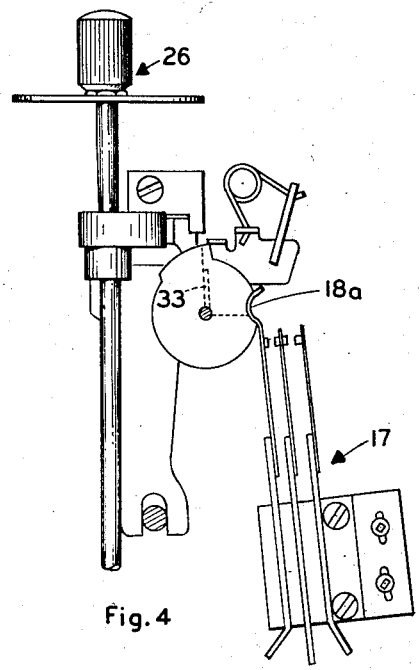
Figure 7:
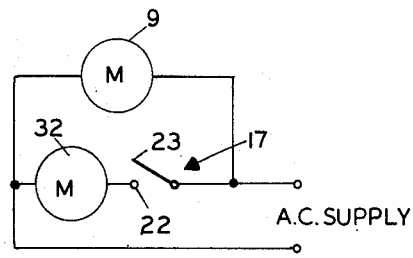
Figure 5:
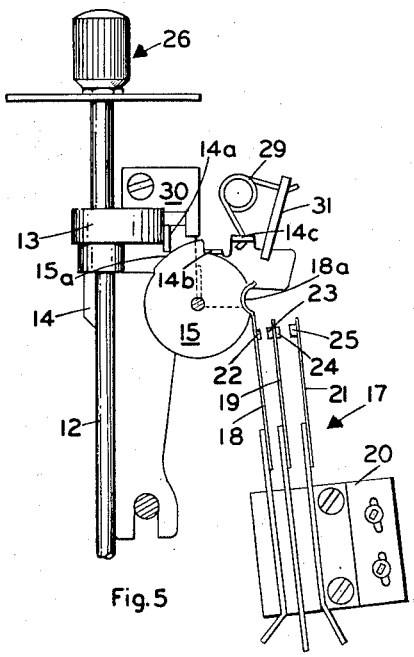
Figure 6:
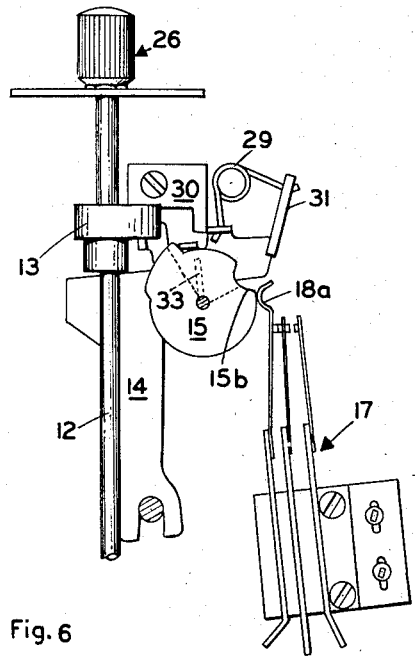

The object of the invention as well as its benefits and advantages, will be readily understood upon reference to the following detailed description, particularly when taken in conjunction with the three sheets of drawings annexed hereto, in which:

Figure 1 is a perspective view of the improved time switch, including portions of related parts of an associated demand meter, and Figure 2 is a side view in elevation of a demand meter, showing how the time switch is mounted therein, and Figure 3 is a perspective view of the control cam forming a part of the novel time switch, showing the "lost motion" between the cam and its driving pin, and Figures 4, 5, and 6 are partial views of the invention, showing various positions of the time switch during its operating cycle, and Figure 7 is a wiring diagram, showing the connections to the time switch.

Referring first to Figures 1 and 2, it is seen that the time switch which forms the present invention is shown as a part of a printing demand meter, with Figure 2 showing a side view of the meter and including a side plate 8, on which the time switch is mounted. The printing demand meter is the subject of a copending application filed by Paul V. Terry on October 4, 1957, Serial No. 688,257, entitled "Printing Demand Meter" and assigned to the same assignee to which the present invention is assigned. It is not necessary in this application to describe the details of the aforesaid printing demand meter save for those few parts of the demand meter which are associated with the time switch. However, it will be helpful to an understanding of the invention to have a general understanding of the functions that are performed by the associated demand meter.

Thus, and as is clearly and explicitly described in the aforesaid copending application, the printing demand meter is adapted to receive demand impulses from an associated watt-hour meter, count the impulses, and print the number of impulses received in each demand interval. The demand meter also includes a maximum demand indicator and an interval indicator, as well as a visual indicator of the total demand being measured. In the aforesaid copending application, the printing demand meter has associated with it an external timer, which initiates resetting of the demand meter at the end of the demand interval, such timer being in the form of a contact-making clock. During reset, a reset motor operates to first lock the demand meter in such a way that no further impulses can be delivered to the printing mechanism, but at the same time allows any such impulses to be diverted into an impulse accumulator. The reset motor also actuates the printing mechanism and resets both the printing and visual counters to zero to ready the demand meter for its next demand interval. After all this has been done, the reset motor is shut off, the demand meter is unlocked, the accumulator feeds any accumulated pulses into the printing mechanism, and the demand meter resumes normal operation.

The time switch which forms the present invention has been devised to replace the external timing mechanism referred to above, but such replacement does not in any way change any of the functions of the demand meter. The time switch may have other applications in addition to its use with demand meters, but, of course, the illustrated use is the one for which the invention was devised.

As mentioned above, the time switch is mounted on the side plate 8 of an associated printing demand meter, and it includes a timing motor 9, a gear train 11 coupled to the timing motor, a shaft 12 driven by the gear train, a timing cam 13 affixed to shaft 12, a pivotally mounted cam follower 14 driven by timing cam 13, a control cam 15 freely journalled on a shaft 16, and an electrical switch 17 having a plurality of spring blades 18, 19, and 21, on which are mounted, respectively, suitable electrical contacts 22, 23, 24, and 25. The spring blades are mounted on a terminal block 20, which in turn is affixed to side plate 8.

The shaft 12 is suitably journalled for rotation in the demand meter and has affixed at its outer end a dial and knob assembly 26, which extends through an opening in the dial plate 27 of the demand meter to cooperate with a scale thereon to indicate the time within any particular demand interval. The knob permits manual setting of the timing mechanism. In operation, the timing motor 9, which may be the well known Telechron synchronous motor, continuously rotates the shaft 12, which, in turn, causes continuous rotation of timing cam 13.

The cam follower 14 has its lower extremity formed into a yoke 27, which straddles a stud 28 affixed to plate 8, to allow the cam follower to pivot as it is actuated by the timing cam. The cam follower has a portion 14a, which cooperates with the timing cam, and another portion 14b, which cooperates with the control cam. A spring 29, having one end affixed to a turnedout portion 31 of end plate 8, has its other end affixed to another portion 14c of the cam follower and biases the cam follower in a counterclockwise direction toward the timing cam 13 and in a downward direction towards the stud 28.

Assuming for a moment that the time switch is in the position of Figure 4, it is seen that rotation of the timing cam not only moves the cam follower 14 in a clockwise direction, but also lifts it away from the stud 28 against the biasing action of spring 29. Such action will continue until the extension 14b drops behind the rise 15a formed in control cam 15. During this action, the control cam will not move, because the end of the spring blade 18 is in the form of a detent, 18a which lies within the cam low 15b formed in control cam 15. The position of the time switch with the cam follower portion 14b latched behind the rise of the control cam is shown in Figure 5, and, as in Figure 4, it will be observed that the contacts 22, 23 are open. Also, it is to be noted that considerable energy has been stored in the biasing spring 29 during this part of the timing cycle. Furthermore, when the portion 14b drops down behind the control cam rise 15a, the cam follower 14 moves downwardly whereby its yoke portion 28 snugly straddles the stud 29.

Shortly after the latching operation, the timing cam 13 will clear the cam follower, and, since the cam follower is no longer restrained, the energy stored in spring 29 will cause the cam follower to move rapidly in a counterclockwise direction about its pivot axis until the extension 14c engages a stop 30 which is affixed to plate 8. Since the control cam 15 floats on shaft 16, it will be driven by this action of the cam follower in a counterclockwise direction relative to shaft 16, causing the cam low 15b to move relative to spring blade 18, whereby the end of the blade snaps out of the low and is then engaged by the surface of cam 15 and pressed to the right to cause closing of the contacts 22, 23. Figure 6 shows the position of the parts at this time. When this occurs, a reset motor 32 is energized and, through a suitable gear train, will drive the shaft 16 in a counterclockwise direction. Reset motor may be a small—25 watt—inductor motor.

As is best shown in Figure 3, motion of shaft 16 will carry with it a pin 33, which lies within a sector cut-out 15c provided in the control cam. There will be no motion of the control cam during initial motion of pin 33, but when the lost motion between the cam and pin is taken up, the pin will then contact the cam, and the cam will then be driven further in a counterclockwise direction through nearly a complete revolution until such time as the cam low 15b once again is opposite the detent end of blade 18, at which point the blade will snap into the low, its associated contacts will be opened, and the reset motor will be de-energized. The electrical connections to both the timing motor and the reset motor are shown in Figure 7, with the contacts 22, 23 being shown in their normally open position.

After de-energization of the reset motor, the timing cam 13 will start the cycle over again, first pushing cam follower portion 14b over control cam rise 15a to latch the control cam, readying the time switch for its next operating cycle at the end of the demand interval.

A cam 34, which is shown on shaft 16, cooperates with the printing platen 35, in the manner set forth in the aforesaid copending Terry application. Knob 36 also affixed to shaft 16 allows for manual resetting of the demand meter.

The control cam 15 can perform an additional switching action during its reset motion by the addition of switch blade 21 and normally open contacts 24, 25. As cam rise 15a sweeps by the end of blade 18, this blade is further depressed toward blade 19 and moves blade 19 toward blade 21 a sufficient amount to cause closure of contacts 24, 25. As the cam rise 15a passes the end of blade 18, this blade will move away from blade 19—not enough to open contacts 22, 23 but enough to allow blade 19 to move away from blade 21 enough to allow the contacts 24, 25 to open. This additional switching action can be used to provide a short duration impulse which can then be used to initiate the resetting of other demand meters. The duration of this impulse can be controlled by the length of the control cam rise.

To control the length of the timing interval, it is only necessary to select the proper gear arrangement in gear train 11. This makes the time switch quite readily and easily adaptable for any required time interval.

Another important feature of the time switch is the floating mounting for the control cam 15. By this arrangement, the spring 29 has only to overcome the force exerted on the cam by spring blade 18 in order to get a snap-action when timing cam 13 clears follower 14. Such snap-action prevents arcing at the contacts 22, 23 and materially improves switch performance. Moreover, since the floating arrangement of cam 15 requires only minimum loading on spring 29, and since the timing motor 9 provides the energy for loading the spring, the torque requirements on the timing motor are kept to a minimum thereby allowing use of a small inexpensive motor. A 4-watt motor may be used very effectively to provide reliable timing and at the same time, develop the necessary torque for latching the cam follower behind the cam rise on the control cam.

The "lost motion" between cam 15 and driving pin 33 allows the cam to turn easily for initial action of the switch and when taken up provides a positive drive for return of the cam to its normal at-rest position. During the return motion of the control cam, its rise portion 15a will move part-way under the cam follower extension 14b thus partially lifting the follower and further relieving the timing motor of its torque requirmeents. Forming the end of blade 18 into a detent portion 18a not only serves to hold the cam in proper position during its at-rest state, but it also helps to get faster, more positive action when the contacts are closing.

All in all, the time switch is a very simple, reliable mechanism, easily and inexpensively manufactured, and versatile in its application. Only minimum forces are needed to initiate switch action, after which resetting of the switch can be accomplished quickly and easily.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. A resettable time switch comprising in combination: a switch having a pair of normally open contacts; a rotatably mounted control cam adapted to cooperate with said switch to open and close said contacts, said control cam having a first at-rest position in which said contacts are open; first means including a continuously operating timing motor operative upon completion of a predetermined interval of time to drive said control cam in a first direction to a second position; said contacts closing when said cam is moved to said second position; and second means operative upon closure of said contacts to drive said control cam in said first direction to said first position whereupon said contacts open and said control cam comes to rest.

2. A resettable time switch comprising, in combination: a switch having a pair of normally open contacts; a rotatably mounted floating control cam cooperating with said switch to open and close said contacts, said control cam having a first at-rest position in which said contacts are open; first means including a continuously operating timing motor and means driven by said timing motor into engagement with said control cam during a timing interval, said driven means being operative upon completion of said interval to drive said cam in a first direction to a second position; said contacts closing when said cam is moved to said second position; and second means operative upon closure of said contacts and engaging said control cam after it has reached said second position to drive said control cam in said first direction back to said first position; said contacts opening when said control cam reaches said first position, said second means being rendered inoperative upon opening of said contacts, said control cam coming to rest when it returns to said first position.

3. A resettable time switch comprising in combination: a switch having a pair of normally open contacts; a rotatably mounted floating control cam cooperating with said switch to open and close said contacts, said control cam having a first position in which said contacts are open; a timing motor; a rotatably mounted timing cam driven by said timing motor, a pivotally mounted cam follower driven by said timing cam; spring means biasing said cam follower against said timing cam; said cam follower having a portion which is moved during a timing interval to engage a portion of said control cam; said timing cam clearing said cam follower upon completion of said timing interval whereupon said biasing means causes said cam follower portion to drive said control cam to a second position, said contacts closing when said control cam moves; and a resetting motor which is energized through said switch and is operative upon closure of said contacts to drive said control cam beyond said second position and on around to said first position, said contacts opening when said first position is reached to de-energize said resetting motor.

4. The combination defined by claim 3 in which said switch includes a pair of spring blades on which are mounted said contacts, one of said blades having an end in the form of a detent which engages said control cam; said control cam having a low portion for receiving said detent.

5. The combination defined by claim 4 in which said switch includes a pair of normally open auxiliary contacts which are closed when said control cam rise passes by said detent upon return of said control cam to said first position.

6. The combination defined by claim 4 in which said control cam has a rise portion over which said portion of said cam follower travels during said time interval and drops behind just prior to the end of said timing interval, said cam follower being adapted to move radially with respect to its pivot axis to permit said portion to travel over said control cam rise, and said spring means biases said cam follower downwardly toward its pivot axis as well as around said pivot axis toward said timing cam.

7. The combination defined by claim 6 wherein said control cam is freely rotatable on a shaft, a pin is mounted on said shaft and is adapted to engage the control cam through a lost-motion arrangement, and said shaft is coupled to said resetting motor to be driven thereby, said pin moving upon energization of said resetting motor to first take up the lost-motion between it and said control cam after which it positively engages said control cam to drive said control cam to said first position.

References Cited in the file of this patent

UNITED STATES PATENTS

| | | |
|---|---|---|
| 2,548,604 | Hickey | Apr. 10, 1951 |
| 2,678,095 | Chapman | May 11, 1954 |
| 2,794,091 | Putz | May 28, 1957 |
| 2,840,655 | Rettie | June 24, 1958 |
| 2,872,075 | Steiner | Feb. 3, 1959 |